United States Patent [19]

Wuermseer

[11] 4,390,153

[45] Jun. 28, 1983

[54] APPARATUS FOR SECURING A WING TO THE BODY OF A CRAFT

[75] Inventor: Matthias Wuermseer, Kirchseeon, Fed. Rep. of Germany

[73] Assignee: Messerschmitt-Boelkow-Blohm Gesellschaft mit beschraenkter Haftung, Munich, Fed. Rep. of Germany

[21] Appl. No.: 173,667

[22] Filed: Jul. 29, 1980

[30] Foreign Application Priority Data

Aug. 11, 1979 [DE] Fed. Rep. of Germany ....... 2932667

[51] Int. Cl.$^3$ .............................................. B64B 1/26
[52] U.S. Cl. ................................ 244/131; 244/117 R; 403/287
[58] Field of Search ...................... 244/131, 117 R, 54, 244/46; 403/287, 374; 416/213 A, 214 R, 219 A

[56] References Cited

U.S. PATENT DOCUMENTS

| 1,549,689 | 8/1925 | Rohrbach | 244/131 |
| 2,242,147 | 5/1941 | Salisbury | 244/131 |
| 2,603,437 | 7/1952 | Satre | 244/131 |
| 3,512,847 | 5/1970 | Link | 244/46 |
| 3,559,924 | 2/1971 | Jochner | 244/46 |
| 3,834,826 | 9/1974 | Simond | 403/374 |
| 4,212,441 | 7/1980 | Ascani et al. | 244/46 |

Primary Examiner—Galen L. Barefoot
Attorney, Agent, or Firm—W. G. Fasse; D. F. Gould

[57] ABSTRACT

A wing is secured to the body of a craft, for example an aircraft, at least at four support points interconnected in pairs by a respective clamping bolt. The metal planking of the upper and lower wing structure forms two wing forks each having a respective securing end and two forked legs. One wing fork is secured with its forked legs to the upper wing structure surface. The other wing fork is secured with its forked legs to the lower wing structure surface. Each of the four support points of the craft body forms a forked bracket so that each support point has two half brackets. The half brackets of a pair are vertically aligned so that the respective clamping bolt may pass through these aligned half brackets and through the respective securing ends of the wing forks extending into the space between two half brackets.

7 Claims, 4 Drawing Figures

APPARATUS FOR SECURING A WING TO THE BODY OF A CRAFT

BACKGROUND OF THE INVENTION

The invention relates to an apparatus for securing a wing to the body of a craft such as an aircraft. Each connecting unit comprises two bearing bolts and a clamping bolt operatively arranged between the wing structure and the aircraft body frame.

Such main connecting devices are known in the art in various modifications. This type of connecting apparatus is primarily used for the supporting of tiltable wings. For example, German Patent Publication (DE-OS) No. 1,531,384 discloses a hinged connection between the fuselage and the tiltable wing of an aircraft. The hinged connection is a combination of two hinging elements movable one within the other. One hinge element is connected to the fuselage. The other hinge element is connected to the aircraft wing. A pin forming a hinging axis and extending crosswise through both hinging elements interconnect these two elements. Using such a main connection for fixed wings is too expensive and unnecessarily increases the material required for the connection and hence its weight. Further, the prior art structure is not at all suitable for a wing, the planking of which is made of fiber compound material since the lamination or the layers forming the wing planking would be delaminated in any event by this type of prior art connecting structure.

German Patent Publication (DE-OS) No. 1,531,393 and U.S. Pat. Nos. 2,103,663, as well as 3,764,093 disclose connecting structures also suitable for aircrafts with tiltable wings. In the just mentioned prior art the bolt connections are exposed to shearing in but one plane. Additionally, the bolt connections are necessarily so constructed that the wing forces are introduced into the bearings such as the lead-lag bearings, or tilting bearings with a moment taking into account an off-center force application. Such off-center moment necessarily requires a larger dimensioning of the individual structural components, thereby correspondingly increasing the weight thereof.

OBJECTS OF THE INVENTION

In view of the above it is the aim of the invention to achieve the following objects singly or in combination:

to construct a main wing connection of the type described above in which the forces occurring in the wing planking are introduced into the fuselage without any secondary bending, namely, by eliminating any off-center moments;

to construct a wing connection which is especially suitable for wings having a planking of fiber compound materials;

to uniformly introduce the wing forces into the fuselage and to make sure that all bolts and/or rivets are subject to a shearing load in two parallel planes; and to reduce the weight of such wing connections.

SUMMARY OF THE INVENTION

According to the invention there is provided an apparatus for securing a wing having upper and lower planking means to the body of a craft such as an aircraft. The upper and lower wing planking near the aircraft body is symmetrically enclosed by means of metal plates secured to the planking by bolts and/or rivets, each of which is exposed to a shearing action in two planes extending substantially in parallel to each other. Thus, the metal plates form a securing end and two respective wing fork legs between which the respective planking is received and to which the planking is secured by said bolts and/or rivets forming first securing means. Four brackets are rigidly secured to the aircraft body and are arranged in pairs to also form forks, one of which is arranged above a longitudinal wing axis or plane and the other of which is located below said axis or plane. Second securing means extend through the forked body brackets and through the securing end of the respective wing connecting fork means formed by said plates. The second securing means in the form of bolts are vertically arranged and also exposed to shearing loads in two planes.

It is an important advantage of the invention that secondary bending moments are avoided and that the shearing loads are distributed in two parallel planes rather than in one plane thereby making it possible to reduce the size and hence the weight of the entire structure, particularly of the securing means.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
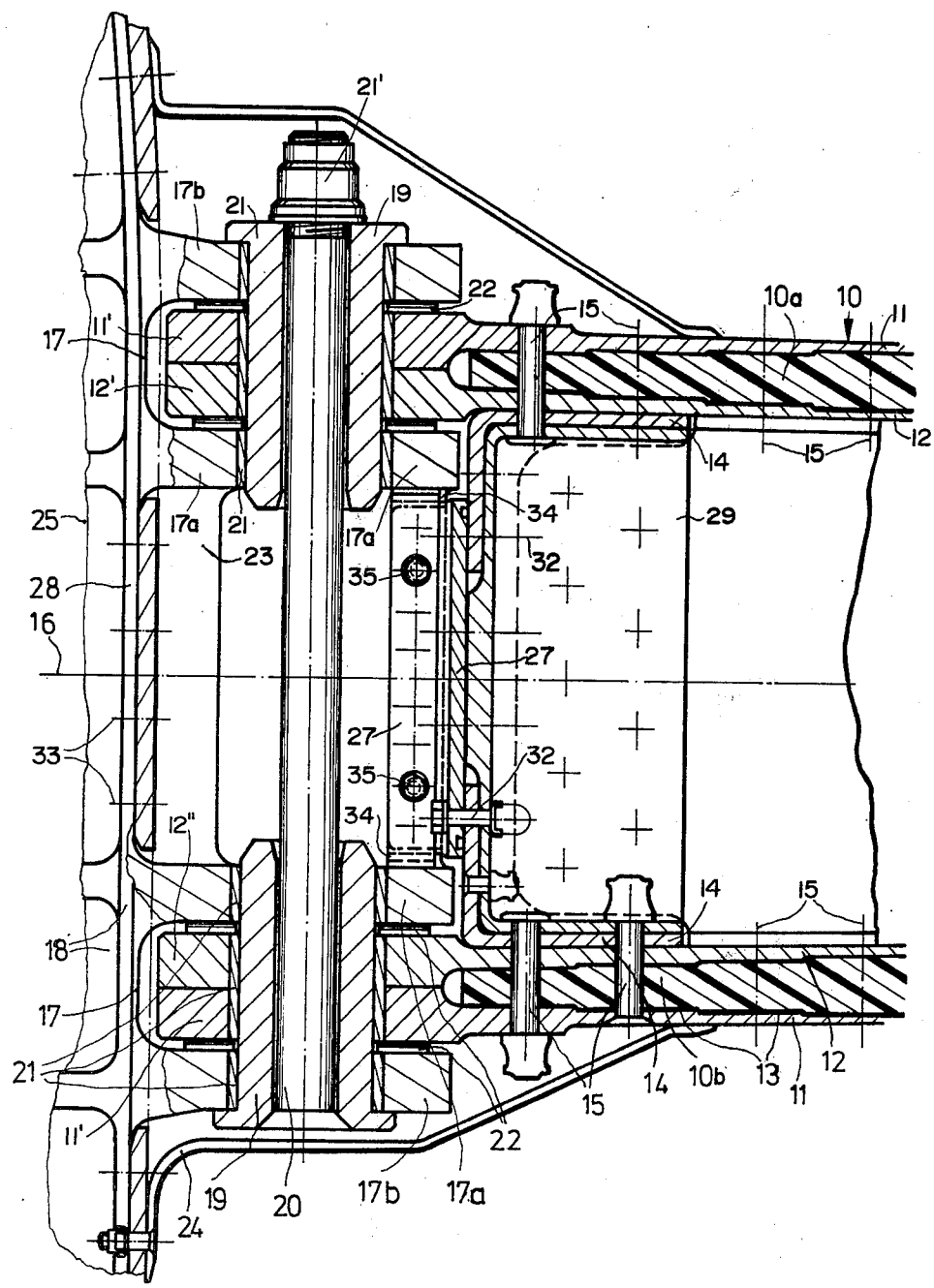
FIG. 1 shows a sectional view through a wing securing structure according to the invention, whereby the sectional plane extends vertically and at a right angle to the longitudinal axis of the aircraft body and vertically through the longitudinal axis of the wing.

FIG. 1 shows a sectional view of a first embodiment according to the invention for a main connection of the wing 10 of an aircraft to the aircraft body structure 18. The wing 10 comprises on its upper surface a planking 10a made of fiber compound material. A similar planking 10b forms the lower surface of the wing. Both upper and lower planks 10a and 10b taper toward the aircraft body in steps 13. Further, both plankings 10a and 10b are secured by bolts or rivets 15 to the legs 11 and 12 of metal plates forming respective connecting forks. These plates also form connecting end 11', 12' facing toward the aircraft body. The inwardly facing surfaces of the legs 11 and 12 are also stepped so that the legs taper in a direction opposite to the taper of the planking 10a and 10b, whereby the respective steps of the planking and of the inwardly facing surfaces of the legs 11 and 12 match into one another.

As best seen in FIG. 1, the rivets or bolts 15 are subjected to a shearing load in two horizontal planes rather than merely in one plane. Further, the bolts or rivets 15 closest to the aircraft body also extend through angle members 14 operatively connected to a wing web 29. The angle members 14 are also connected to a rib 27, for example, by welding or bolts and nuts 32. The metal plates 11 and 12 with their ends 11' and 12' form the connecting means of the wing to be secured to the aircraft body structure 18. For this purpose the connecting ends 11' and 12' reach into the space between fork forming brackets 17a and 17b arranged in pairs 17 which are structurally connected to the aircraft body. Vertically aligned holes through the brackets 17a, 17b receive bushings 21 or a plurality of such bushings which in turn extend with their central part through the connecting ends 11', 12'. Spacer washers 22 may be inserted between the inwardly facing surfaces of the brackets 17a, 17b and the respective opposite surfaces of the connecting ends 11', 12'.

Figure 2:
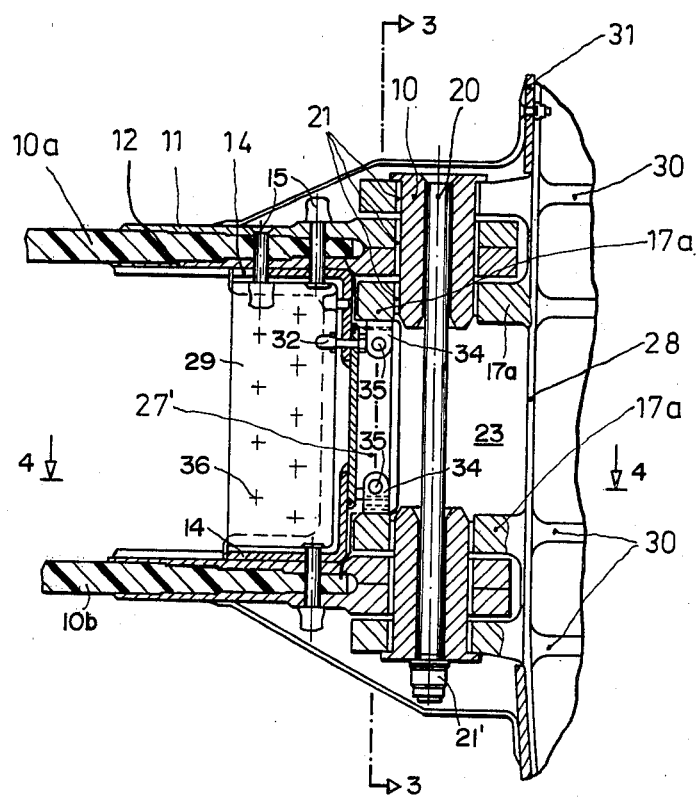
FIG. 2 is a sectional view similar to that of FIG. 1, but showing a modified embodiment in which the connecting means between a wing rib and the inwardly facing fork brackets differs somewhat from the respective connecting means shown in FIG. 1.

The ribs 74+27 at the end or root of the wing are customarily a U-section. In FIGS. 1 and 2 the rib 27 is secured to the above mentioned angle members 14 and to the wing web 29. The wing web 29 takes up primarily forces extending perpendicularly and vertically relative to the longitudinal axis 16 of the wing.

The securing means which form part of the aircraft body structure include the above mentioned fork forming brackets or fork legs 17a, 17b secured to a fuselage rib 28. The brackets or fork legs 17a forming the inwardly facing brackets which face the central axis 16 and the outer brackets 17b are arranged to extend in parallel to one another and to the axis 16. Additionally, the brackets or fork legs 17a, 17b are arranged in the plane defined by the respective fuselage rib 28. The bushings 21 which are located in these brackets or fork legs 17a, 17b form bearings for the connecting ends 11', 12'.

As mentioned, the connecting ends 11', 12' are inserted into the spaces between the brackets or fork legs 17a, 17b so that the wing connecting elements including the metal plates 11 and 12 and the components connected thereto may be secured to the fuselage 18 by means of hollow bolts or bushings 19 which extend through the bushings 21. The hollow bolts or bushings 19 in turn are held in position by a clamping bolt 20 secured by a nut 21'. It will be noted from FIG. 1 that the bolts 19 are subject to shearing loads in two planes substantially where the spacer washers 22 are located. Incidentally, the spacer washers 22 may be of elastically yielding material to accommodate slight movements of the connecting ends 11' and 12' of the metal plates 11 and 12 between the brackets 17a, 17b.

Figure 4:
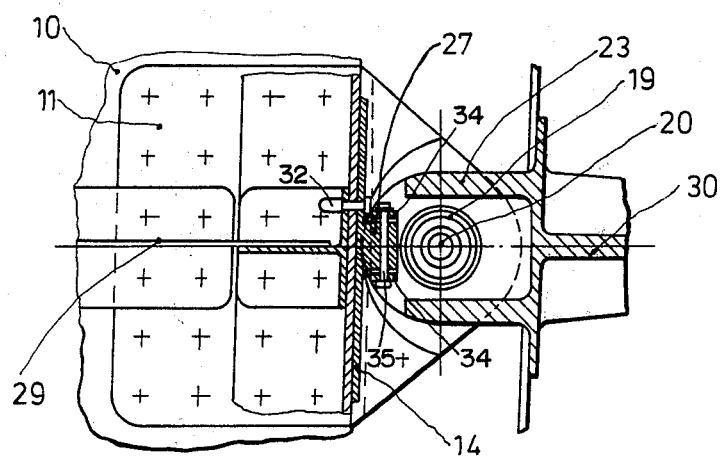
FIG. 4 is a sectional view along section line 4—4 in FIG. 2.

The inwardly facing brackets 17a are interconnected by ribs 23 to take up forces effective perpendicularly and substantially at right angles to the wing axis 16. As shown in FIG. 1, the ribs 23 are directly connected to the body rib 28 by means of screws 33 for example on the one hand, and to the brackets 17a on the other hand.* The outer free ends of the brackets 17a are in turn connected to the wing rib or bracket 27 by means of extensions 34 and bolts 35, please also see FIG. 4. Since the rib or bracket 27 is connected to the wing web 29 through the bolts 32 and angle member 14, cross forces on the wing are directly introduced into the structure 18 of the fuselage 25.

* Normally the parts 17a, 17b, 23, 15, 18 and 30 form the bulkhead

Figure 3:
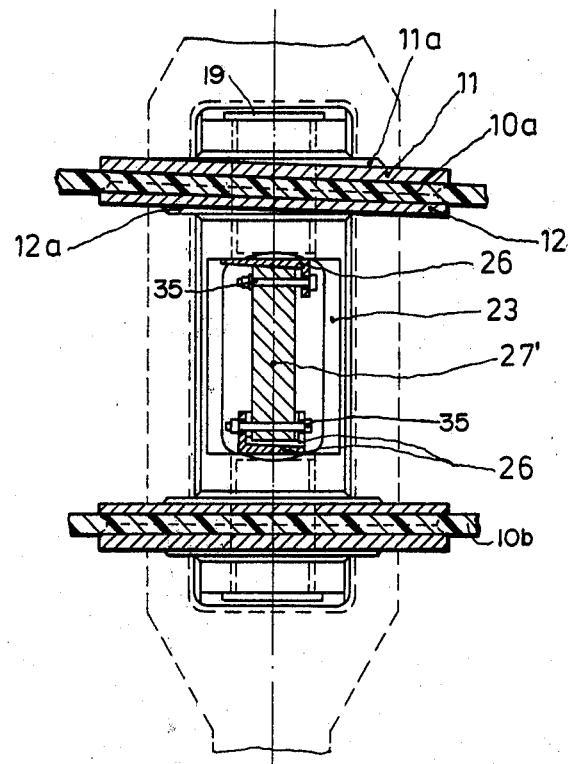
FIG. 3 is a sectional view along section line 3—3 in FIG. 2 and shows, especially in its upper part, means for compensating any angular slanting of the wing planking due to the wing sheer.

FIGS. 2 and 3 show a modification of the connection between the rib or bracket 27' and the wing web 29. As best seen in FIG. 3, wedges 26 are interposed between the rib or bracket 27' and the brackets 17a in order to accommodate tolerances between these connecting components. The ribs 23 shown in FIG. 3, which are arranged between the inwardly facing brackets 17a, are modified for cooperation with the wedges 26. One or several such wedges may be used, whereby a substantial tolerance becomes acceptable.

In both embodiments the function and load distribution are substantially the same because in both instances the tapering ends 10a and 10b of the wing planking are symmetrically received between the metal plates 11 and 12 so that shearing forces are applied in two planes to the bolts or rivets 15 and the forces are introduced into the connecting points of the aircraft body structure 18 in a centered manner without any possibility of generating off-center force introduction moments. Further, conducting the forces from the connecting brackets 17a, 17b into the rib 28 of the fuselage structure 18 also does not generate any off-center moments. Therefore, no secondary bending of the connecting structure is possible. As shown in FIG. 1, each wing planking has, so to speak its own connecting bolt 19, each of which is subject to shearing forces in two planes. The two bolts 19 are vertically aligned so that a total of four shearing planes are established outside the aircraft body 25. This structure results in a completely uniform and symmetric force introduction from the wing planking into the aircraft body 25. As a result, substantially smaller bolt diameters may be used without giving up the reliability and safety of the connecting structure while simultaneously achieving substantial savings in structural weight.

Yet another advantage is seen in the fact that a delaminating of the layers forming the wing planking 10a and 10b is avoided by this symmetric and uniform force introduction.

It is preferable to construct the brackets 17a, 17b and the rib 28 as an integral component, for example, by milling and to weld the vertical cross ribs 23 to the inwardly facing brackets 17a and to the rib 28. Whereby again a uniform force distribution and introduction is accomplished.

It has been found, that the just described structure satisfies all so-called "fail-safe" requirements without any additional structural weight and in fact with a weight reduction.

Referring again to FIG. 3 the upper planking 10a extends at a certain sheer angle. In order to accommodate such a shear angle the metal plates 11 and 12 are provided with respective bosses 11a and 12a so that the force introduction into the bolt 19 is again in two parallel planes and the generation of off-center moments is avoided.

Incidentally, conventional connectors such as bolts and nuts, or rivets or the like are shown at 33 and 36.

Although the invention has been described with reference to specific example embodiments, it will be appreciated, that it is intended, to cover all modifications and equivalents within the scope of the appended claims.

What is claimed is:

1. An apparatus for securing a fixed wing (10) having upper and lower fiber compound material planking means (10a, 10b), to the body (18) of a craft, such as an aircraft, comprising upper and lower wing fork means each having a securing end (11', 12') and two wing fork legs in the form of metal plates (11, 12) forming a gap having surfaces with a tapering facing said wing planking means having a corresponding tapering facing the wing fork means, first means (14, 15) operatively securing the metal plates of the wing fork legs (11, 12) to the respective wing planking means (10a, 10b), upper and lower forked body bracket means (17) arranged in pairs and rigidly secured to the body (18) of the craft, each of said body bracket means having forked bracket legs (17a, 17b), said securing ends (11', 12') of said wing fork metal plates (11, 12) reaching into a space between said forked body bracket legs (17a, 17b), second rigid securing means (19, 20) extending through said body bracket means (17) and through the respective securing ends (11', 12') of the corresponding wing fork means (11, 12) whereby each of said first and second securing means is subject to shearing loads in two planes, wherein said wing (10) has a central plane extending substantially through the leading and trailing edge of the wing, and wherein said forked body bracket legs (17a, 17b) of said upper and lower body bracket means (17) form four brackets (17a, 17b) arranged so that two pairs of fork legs each are vertically aligned symmetrically above and below said central plane of the wing, whereby forces are uniformly and symmetrically introduced into the body and secondary bending of the wing structure and hence introduction of secondary bending moments into the body of the craft are avoided.

2. The apparatus of claim 1, wherein said second securing means are hollow bushing means, said second securing means further comprising clamping bolt means operatively extending through said hollow bushing means which are vertically aligned in pairs.

3. The apparatus of claim 1, further comprising reinforcing rib means operatively interconnecting vertically aligned body bracket means for taking up transverse loads.

4. The apparatus of claim 3, wherein said body bracket means have inner brackets facing a central wing plane and outer brackets facing away from said central wing plane, said apparatus further comprising wing mounting means (27), wedging means (26) operatively interposed between said wing mounting means and said inner body brackets, and bolt means for securing said wedging means whereby transverse wing forces are introduced into the body of the craft and whereby tolerances are compensated.

5. The apparatus of claim 1, wherein said taperings of said upper and lower wing planking means and said taperings of said metal plates comprise cooperating steps (13) tapering the wing fork legs and the wing planking means in opposite directions in a stepped manner.

6. The apparatus of claim 1, wherein said metal plates comprise thickened portions (11a, 12a) for compensating any wing sheer.

7. The apparatus of claim 5, wherein said metal plates of the wing fork legs taper away from said body and wherein said planking means taper toward said body.

* * * * *